United States Patent [19]

Worthen et al.

[11] Patent Number: 4,685,359
[45] Date of Patent: Aug. 11, 1987

[54] METHOD OF HARDFACING STEEL BODIED BITS

[75] Inventors: Steven J. Worthen, Houston; James D. Oursler, Pearland, both of Tex.

[73] Assignee: Hughes Tool Company-USA, Houston, Tex.

[21] Appl. No.: 893,112

[22] Filed: Aug. 4, 1986

[51] Int. Cl.⁴ .............................................. B21K 5/02
[52] U.S. Cl. .............................. 76/108 A; 76/101 E
[58] Field of Search ............. 76/108 A, 108 R, 101 R, 76/101 E, DIG. 2, DIG. 11, DIG. 12

[56] References Cited

U.S. PATENT DOCUMENTS

| | | | |
|---|---|---|---|
| 3,358,783 | 12/1967 | Raynal et al. | 76/108 R |
| 3,743,556 | 7/1973 | Breton et al. | |
| 3,778,586 | 12/1973 | Breton et al. | |
| 4,194,040 | 3/1980 | Breton et al. | |
| 4,396,077 | 8/1983 | Radtke | 76/108 A |
| 4,505,342 | 3/1985 | Barr et al. | |

OTHER PUBLICATIONS

"Conforma Clad—a New Process for Customized Coatings," Manek R. Rustoor, Ph.D., Imperial Clevite, Inc., 1983.

Primary Examiner—Roscoe V. Parker
Attorney, Agent, or Firm—Charles D. Gunter, Jr.

[57] ABSTRACT

A method of manufacturing a steel bodied bit is shown in which a hardfacing of a highly conformable metal cloth containing hard, wear resistant particles is applied to the bit face as well as to the interior of the bit nozzle openings. By hardfacing the nozzle openings, fluid erosion in the region of the openings is eliminated.

5 Claims, 3 Drawing Figures

METHOD OF HARDFACING STEEL BODIED BITS

BACKGROUND OF THE INVENTION

1. Field of the Invention

This invention relates in general to earth boring bits of the type having fluid nozzle openings for communicating drilling fluid to the bit face, and in particular to a method of hardfacing a steel bodied bit to prevent erosion by fluid communicated through the nozzle openings.

2. Description of the Prior Art

An earth boring bit of the type concerned herein has a body with a threaded pin on its upper end for connection to a string of drill pipe extending to the surface. The bit has a cutting face on its lower end, which is an integral part of the body. Polycrystalline diamond (PDC) disk cutting elements are mounted on the face by studs received in holes provided in face. Normally, there are several passages extending through the body for discharging drilling fluid pumped down the drill string. Nozzles are located at the outlets of the passages. The nozzle is normally of tungsten carbide to resist erosion.

In the past, steel bodied bits of the type under consideration were hardfaced by using "plasma spray" or "detonation gun" processes. These techniques are "line of sight" processes, in that the hardfacing material is hurled at the target substrate at high velocity, making it impossible to hardface the interior of the nozzle openings satisfactorily. As a result, the prior art bits were subject to erosion or undermining of the hardfacing on the bit face near the nozzle openings due to the flow of drilling fluid past the unhardfaced areas.

SUMMARY OF THE INVENTION

The present invention has as its object a method for hardfacing a steel bodied earth drilling bit in which the bit face and the interior of the nozzle openings are integrally coated with a hardfacing material.

Another object of the invention is a method of providing such a hardfacing on a steel bodied bit without adversely affecting the heat treatment of the steel.

Another object of the invention is a method for providing such a hardfacing on a steel bodied bit having polycrystalline diamond cutter elements which are mounted on studs in holes provided in the bit face.

These and other objects are accomplished in a manufacturing method in which a steel body is machined to form a bit having an axial passage and a bit face of a desired profile. Nozzle openings are then drilled in the bit face which communicate by fluid passages with the axial passage of the bit body. Next, shallow indicator regions of a predetermined diameter are drilled on the bit face, the diameter being slightly larger than that required to receive the cutter elements. A hardfacing is then applied to the bit face and within the nozzle openings by brazing thereon a highly conformable metal cloth containing hard, wear resistant particles, the hardfacing being omitted from the indicator regions. The bit body is then heat treated in the conventional manner. After the heat treatment, cutter element holes are drilled through the indicator regions, the holes being sized to receive and retain the cutter elements. The cutter elements are then afixed within the cutter element holes and the nozzles are installed within the nozzle openings.

Additional objects, features and advantages will be apparent in the written description which follows.

DESCRIPTION OF THE DRAWINGS

FIG. 3 is an enlarged partial perspective view of an indicator region for drilling the cutter element holes used in the bit of FIG. 1.

DESCRIPTION OF THE PREFERRED EMBODIMENT

Figure 1:
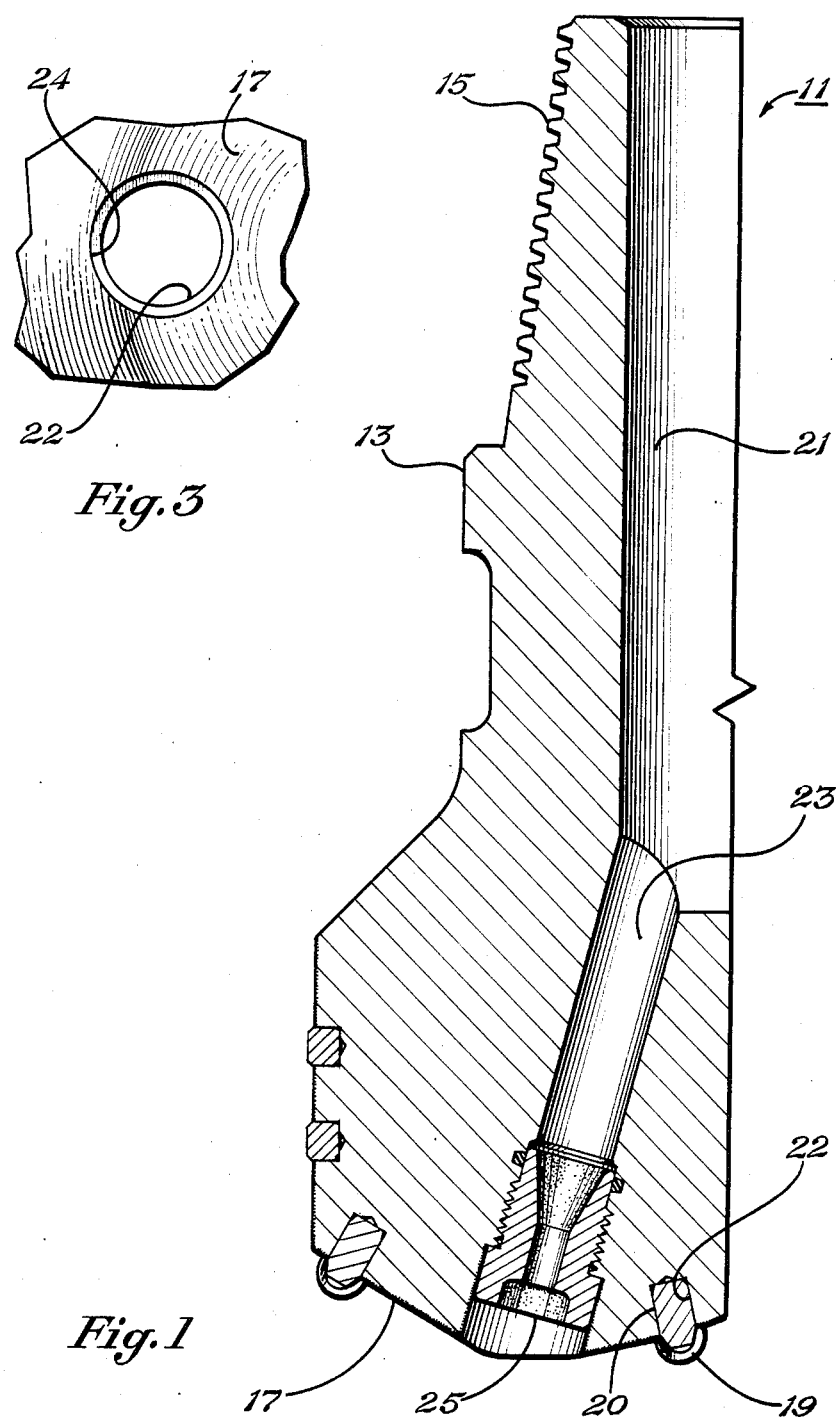
FIG. 1 is a quarter sectional view of an earth boring bit having a nozzle opening which is hardfaced using the method of the invention.

Referring to FIG. 1, a finished earth boring bit of the type under consideration will first be described. The earth boring bit 11 is of a solid head type. Bit 11 has a steel body 13 with a threaded pin 15 on its upper end for connection to a string (not shown) of drill pipe. A cutting face 17 is located on the lower end. A plurality of cutter elements 19 are secured within holes formed in the cutting face 17. The cutter elements 19 in the embodiment shown in FIG. 1 are of the polycrystalline diamond (PDC) disk type. Such cutter elements have a polycrystalline diamond layer which is afixed to a tungsten carbide "stud" 20 of generally cylindrical external configuration. PDC cutters of the type under consideration are commercially available to the drilling industry from General Electric Company under the "STRATA-PAX" trademark.

An axial passage 21 extends longitudinally into the body 13 from the upper end for communicating with the interior of the drill string. There are several (only one shown) fluid passages 23 that extend from the axial passage 21 to the face 17 for discharging drilling fluid into the wellbore. A nozzle 25 is located at the outlet of each fluid passage 23.

Figure 2:
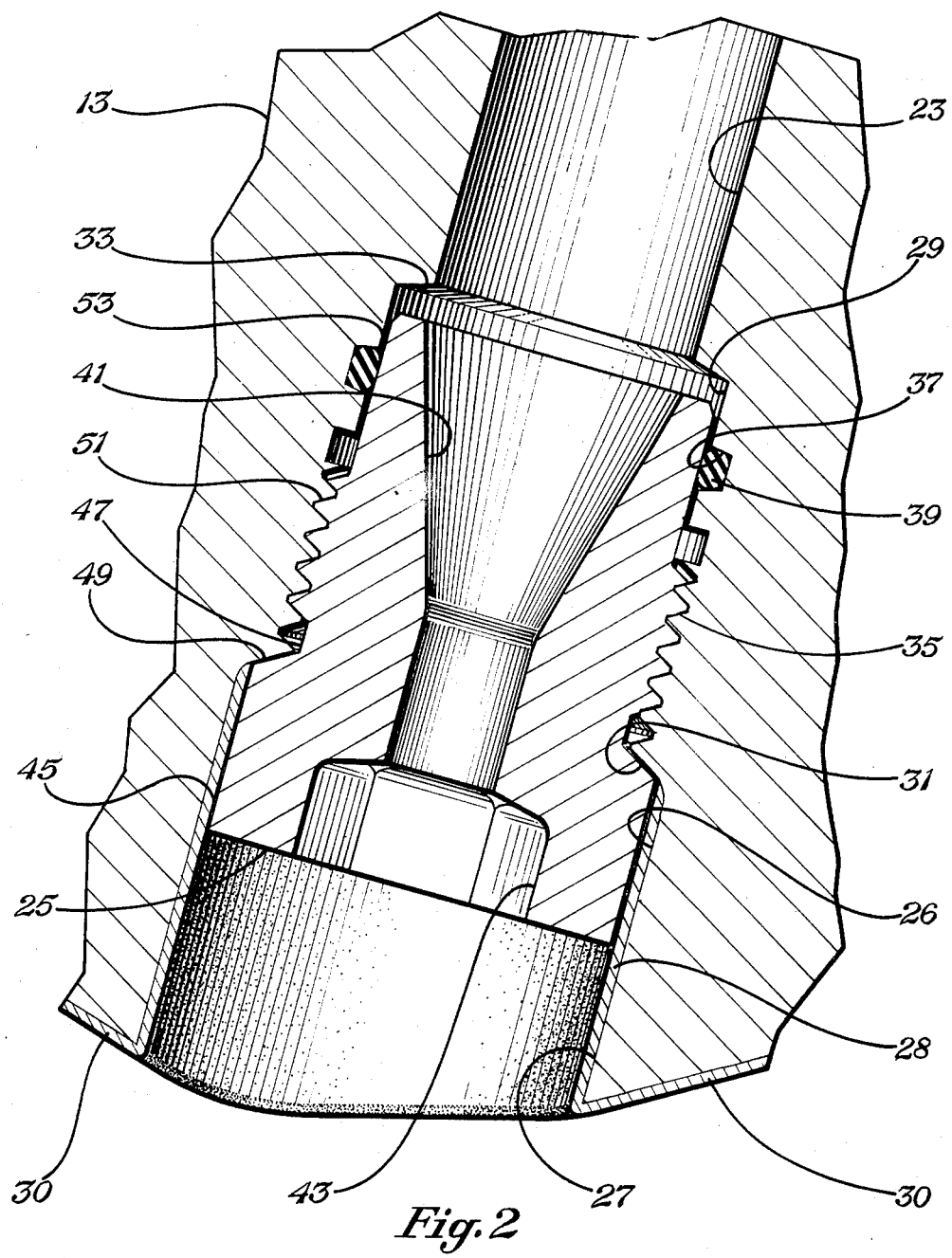
FIG. 2 is an enlarged partial sectional view of the nozzle of FIG. 1.

Referring to FIG. 2, each fluid passage 23 has a lower counterbore section 26 of cylindrical configuration and which comprises an opening 27 for communicating with the bit face 17. The lower counterbore section 26 joins an upper counterbore section 29 of smaller diameter, resulting in a lower shoulder 31 located between the upper and lower counterbore sections 27 and 29. Lower shoulder 31 faces downwardly and is beveled. An upper shoulder 33 is located at the upper end of the upper counterbore section 29. Upper shoulder 33 faces downwardly and is also beveled.

A set of threads 51 are formed on the exterior of the nozzle upper section 47. A nose section 53 extends from the upper end of threads 51 to the upper end 55. Nose section 53 has a smooth cylindrical exterior for sealing against the O-ring 39. Nozzle shoulder 49 seats against lower shoulder 31 of the nozzle opening. The upper end 55 of nozzle 25 is spaced below the upper shoulder 33 a short distance when the nozzle 25 is fully made up.

The method of hardfacing the bit 11 will now be described. In the method of the invention, a forged body is machined in the conventional manner to form the bit shown in FIG. 1 having bit face 17 of a desired profile and having axial passage 21. The nozzle openings 27 are then drilled in the bit face 17 to communicate by means of fluid passages 23 with the axial passage 21.

In the prior art manufacturing process, the cutter element holes 22 would now be drilled, the cutter elements 19 would be press fit within the holes 22, and the bit face 17 would be hardfaced by plasma spray or another "cold" process. However, the hardfacing process used in the present method requires brazing the bit at a temperature above the critical temperature of the steel. To avoid distortion, the cutter element holes cannot be drilled to full depth at this point in the manufacturing process.

Instead, shallow indicator regions are then drilled of a predetermined diameter on the bit face to mark the future location of the cutter element holes 22. The diameter of the indicator regions (shown in exaggerated fashion as 24 in FIG. 1) is slightly larger than that required to receive the cutter element studs 20. For example, a normal cutter element hole is ⅝". The indicator region would be drilled ⅝"+1/32 to 1/16". The depth of the indicator region is less than the full depth normally utilized to retain the cutter element stud. The depth is preferably only that necessary to give a visual location of the cutter element holes 22 which are to be drilled to full depth in a later step.

The bit face 17 and the interior 26 of the nozzle opening is then hardfaced by applying a highly conformable metal cloth containing hard, wear reistant particles to the bit face and to the interior of the nozzle openings (indicated as 28,30 in FIG. 2). The preferred highly conformable metal cloth material is sold under the trademark "CONFORMA CLAD" by Imperial Clevite, Inc. of Salem, Ind. The preferred CONFORMA CLAD cloth material, sold as WC2, is comprised of tungsten carbide (60% 325 mesh and 40% 2-5 micron) in a Ni-Cr-B brazing alloy matrix. The cloth in which the hardfacing and brazing material is enmeshed is comprised of polytetrafluoroethylene (PTFE) fibers. U.S. Pat. Nos. 3,743,566; 4,194,040; and 3,778,586 also describe the CONFORMA CLAD material of the type utilized in the method of the invention.

The cloth material is applied by cutting to shape and covering the areas to be hardfaced. This would include the bit face 17 (FIG. 1) and the nozzle openings 27 (FIG. 2). As best seen in FIG. 2, the nozzle openings 27 are coated down to approximately the beginning of shoulder 31 but the threads 35 are not coated. The material can be cut to fit the cylindrical shape of the opening 27. It is also important to note that the indicator regions (area within the diameter 24 in FIG. 3) on the bit face are not coated with the CONFORMA CLAD cloth. The CONFORMA CLAD material should approach, but not exceed, the diameter of the indicator regions 24 to allow the later drilling of the indicator regions to form the cutter element holes 22.

The bit with the CONFORMA CLAD material applied is then placed in a furnace and brazed at a temperature of approximately 2100 degrees F. for 5-10 minutes. Since the braze temperature of the COMFORMA-CLAD exceeds the critical temperature of the steel (about 1300 degrees F.), it is necessary that the brazing step preceed the traditional heat treatment step in which the steel bit body is heat treated, quenched and tempered.

The bit body is then allowed to cool from the brazing temperature and is heat treated in conventional manner. Those skilled in the art will appreciate that a variety of heat treatments can be utilized to produce a bit body having the desired metalurigical characteristics. An example bit was heat treated by heating to 1610 degrees F. with a 0.80 to 0.90% $CO_2$ atmosphere (approximately 0.20% C potential) followed by an oil quench. The bit was then be tempered at 800 degrees F. for one hour.

The cutter element holes 22 are then drilled through the indicator regions 24. These holes are of a smaller diameter than the indicator regions but of sufficient diameter to receive and retain the cutter element studs 20. The holes are of full depth for retaining the cutter element studs, as shown in FIG. 1. Although the cutter elements 19 can be brazed, welded, cemented or otherwise afixed within the holes, they are preferably press fit within the cutter element holes, as will be familiar to those skilled in the art.

After afixing the cutter elements, the nozzles 25 can be installed within the nozzle openings 27, as by threaded engagement of the nozzle threads 51 with the threaded interior of the nozzle opening 27.

An invention has been provided with several advantages. The CONFORMA CLAD hardfacing treatment exhibits improved bonding to the steel substrate, since instead of creating a mechanical bond, a metallurgical bond is created during the brazing step. The hardfaced nozzle interiors prevent erosion problems in the region adjacent the nozzle openings to the bit face during drilling. These improved bit properties are achieved by the manufacturing method of the invention without detracting from the desired heat treatment characteristics of the steel since the heat treatment step follows the hardfacing step.

The invention has been shown in only one of its forms. It should be apparent to those skilled in the art that it is not so limited, but is susceptible to various changes and modifications without departing from the spirit thereof.

We claim:

1. A method of manufacturing a steel bodied bit of the type having cutter elements which disintegrate earthen formations, the method comprising the steps of:

machining a steel body to form a bit having a bit face of a desired profile and an axial passage;

drilling nozzle openings in the bit face which communicate by fluid passages with the axial passage of the bit body;

drilling shallow indicator regions of a predetermined diameter on the bit face, the diameter being slightly larger than that required to receive the cutter elements;

applying a hardfacing to the bit face and within the nozzle openings by brazing thereon a highly conformable metal cloth containing hard, wear resistant particles, the hardfacing being omitted from the indicator regions;

heat treating the bit body;

drilling cutter element holes through the indicator regions, the holes being sized to receive and retain the cutter elements;

afixing the cutter elements within the cutter element holes and installing nozzles within the nozzle openings.

2. A method of manufacturing a steel bodied bit of the type having cutter elements which disintegrate earthen formations, the method comprising the steps of:

machining a steel body to form a bit having a bit face of a desired profile and an axial passage;

drilling nozzle openings in the bit face which communicate by fluid passages with the axial passage of the bit body;

drilling shallow indicator regions of a predetermined diameter on the bit face, the diameter being slightly larger than that required to receive the cutter elements;

hardfacing the bit face and nozzle openings by applying a highly conformable metal cloth containing hard, wear resistant particles to the bit face and within the nozzle openings and brazing the cloth material to the bit body in a furnace at a temperature above the critical temperature of the steel, the hardfacing being omitted from the indicator regions;

allowing the bit body to cool from the brazing temperature and then heat treating the bit body;

drilling cutter element holes through the indicator regions, the holes being sized to receive and retain the cutter elements;

afixing the cutter elements within the cutter element holes and installing nozzles within the nozzle openings.

3. A method of manufacturing a steel bodied bit of the type having polycrystalline diamond cutter elements which disintegrate earthen formations, the method comprising the steps of:

machining a steel body to form a bit having a bit face of a desired profile and an axial passage;

drilling nozzle openings in the bit face which communicate by fluid passages with the axial passage of the bit body, each nozzle opening having an interior with a threaded region for receiving an externally threaded fluid nozzle;

drilling shallow indicator regions of a predetermined diameter on the bit face, the diameter being slightly larger than that required to receive the cutter elements;

hardfacing the bit face and nozzle openings by applying a highly conformable metal cloth containing hard, wear resistant particles to the bit face and to the interior of the nozzle openings and brazing the cloth material to the bit body in a furnace at a temperature above the critical temperature of the steel, the hardfacing being omitted from the indicator regions on the bit face and from the threaded regions of the nozzle openings;

allowing the bit body to cool from the brazing temperature and then heat treating the bit body;

drilling cutter element holes through the indicator regions, the holes being of a smaller diameter than the indicator regions but of sufficient diameter to receive and retain the cutter elements;

afixing the cutter elements within the cutter element holes and installing nozzles within the nozzle openings.

4. A method of manufacturing a steel bodied bit of the type having polycrystalline diamond cutter elements which disintegrate earthen formations, the method comprising the steps of:

forging a steel body;

machining the forged body to form a bit having a bit face of a desired profile and having an axial passage;

drilling nozzle openings in the bit face which communicate by fluid passages with the axial passage of the bit body, each nozzle opening having an interior with a threaded region for receiving an externally threaded fluid nozzle;

drilling shallow indicator regions of a predetermined diameter on the bit face, the diameter being slightly larger than that required to receive the cutter elements, the depth of the indicator regions being less than the full depth normally utilized to retain the cutter elements;

hardfacing the bit face and nozzle openings by applying a highly conformable metal cloth containing hard, wear resistant particles to the bit face and to the interior of the nozzle openings and brazing the cloth material to the bit body in a furnace at a temperature in the range of 2100 degrees F., the hardfacing being omitted from the indicator regions on the bit face and from the threaded regions of the nozzle openings;

allowing the bit body to cool from the brazing temperature and then heat treating the bit body;

drilling cutter element holes through the indicator regions, the holes being of a smaller diameter than the indicator regions but of sufficient diameter to receive and retain the cutter elements, the holes being of full depth for retaining the cutter elements;

afixing the cutter elements within the cutter element holes and installing nozzles within the nozzle openings.

5. A method of manufacturing a steel bodied bit of the type having polycrystalline diamond cutter elements which disintegrate earthen formations, the method comprising the steps of:

forging a steel body;

machining the forged body to form a bit having a bit face of a desired profile and having an axial passage;

drilling nozzle openings in the bit face which communicate by fluid passages with the axial passage of the bit body, each nozzle opening having an interior with sidewalls, a region of the sidewalls being threaded for receiving an externally threaded fluid nozzle;

drilling shallow indicator regions of a predetermined diameter on the bit face, the diameter being slightly larger than that required to receive the cutter elements, the cutter elements being polycrystalline diamond compacts which are mounted on cylindrical studs, the depth of the indicator regions being less than the full depth normally utilized to retain the cutter element studs;

hardfacing the bit face and the interior of the nozzle openings down to approximately the threaded region by applying a highly conformable metal cloth containing hard, wear resistant particles to the bit face and to the interior of the nozzle openings and brazing the cloth material to the bit body in a furnace at a temperature in the range of 2100 degrees F., the hardfacing being omitted from the indicator regions on the bit face;

allowing the bit body to cool from the brazing temperature and then heat treating the bit body;

drilling cutter element holes through the indicator regions, the holes being of a smaller diameter than the indicator regions but of sufficient diameter to receive and retain the cutter element studs, the holes being of full depth for retaining the cutter element studs;

press fitting the cutter element studs within the cutter element holes and threading the nozzles within the threaded sidewalls of the interior of the nozzle openings.

* * * * *

UNITED STATES PATENT AND TRADEMARK OFFICE
CERTIFICATE OF CORRECTION

PATENT NO. : 4,685,359

DATED : August 11, 1987

INVENTOR(S) : Steven J. Worthen et al.

It is certified that error appears in the above-identified patent and that said Letters Patent is hereby corrected as shown below:

Under "other publications" on page 1, change
"Manek R. Rustoor" to --Manek R. Dustoor--;

In Col. 1, line 19 insert --the-- after the second occurance of "in";

In Col. 3, line 22, change "reistant" to --resistant--;

In Col. 3, line 63, change "metallurigical" to -- metallurgical--;

In Col. 3, line 67, delete the word "be".

Signed and Sealed this

Fifth Day of January, 1988

Attest:

DONALD J. QUIGG

Attesting Officer

Commissioner of Patents and Trademarks